US009165399B2

(12) United States Patent
Uralsky et al.

(10) Patent No.: US 9,165,399 B2
(45) Date of Patent: Oct. 20, 2015

(54) SYSTEM, METHOD, AND COMPUTER PROGRAM PRODUCT FOR INPUTTING MODIFIED COVERAGE DATA INTO A PIXEL SHADER

(71) Applicant: NVIDIA Corporation, Santa Clara, CA (US)

(72) Inventors: Yury Uralsky, Santa Clara, CA (US); Henry Packard Moreton, Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 113 days.

(21) Appl. No.: 13/666,878

(22) Filed: Nov. 1, 2012

(65) Prior Publication Data

US 2014/0118351 A1    May 1, 2014

(51) Int. Cl.
*G06T 15/00* (2011.01)
*G06T 15/40* (2011.01)
*G06T 15/50* (2011.01)

(52) U.S. Cl.
CPC ............ *G06T 15/405* (2013.01); *G06T 15/503* (2013.01)

(58) Field of Classification Search
CPC ............ G06T 1/20; G06T 15/00; G06T 7/40; G06T 1/60
USPC .......... 345/421, 426, 428, 506, 611, 619, 620
See application file for complete search history.

(56) References Cited

U.S. PATENT DOCUMENTS

| 7,184,040 | B1 | 2/2007 | Tzvetkov | |
|---|---|---|---|---|
| 7,382,368 | B1 * | 6/2008 | Molnar et al. | 345/421 |
| 7,808,503 | B2 * | 10/2010 | Duluk et al. | 345/506 |
| 7,817,165 | B1 * | 10/2010 | Donham et al. | 345/619 |
| 7,876,322 | B2 * | 1/2011 | Xie et al. | 345/428 |
| 7,978,194 | B2 * | 7/2011 | Seiler et al. | 345/422 |
| 8,044,971 | B2 * | 10/2011 | Nystad | 345/614 |
| 8,184,117 | B2 * | 5/2012 | Brennan | 345/420 |
| 8,269,792 | B2 * | 9/2012 | Jiao et al. | 345/620 |
| 8,547,395 | B1 * | 10/2013 | Hutchins et al. | 345/611 |
| 8,704,830 | B2 * | 4/2014 | Kilgard et al. | 345/422 |
| 8,730,253 | B2 * | 5/2014 | Kilgard | 345/582 |
| 2007/0291030 | A1 | 12/2007 | Fowler et al. | |
| 2008/0198168 | A1 | 8/2008 | Jiao et al. | |
| 2012/0069021 | A1 | 3/2012 | Son et al. | |
| 2012/0212488 | A1 | 8/2012 | Yu et al. | |

OTHER PUBLICATIONS

Examination Report from German Patent Application No. 10 2013 221 024.8, dated Jun. 12, 2014.
Office Action from Taiwan Application No. 102138940, dated May 25, 2015.

* cited by examiner

*Primary Examiner* — Phu K Nguyen
(74) *Attorney, Agent, or Firm* — Zilka-Kotab, PC

(57) ABSTRACT

A system, method, and computer program product are provided for inputting modified coverage data into a pixel shader. In use, coverage data modified by a depth/stencil test is input into a pixel shader. Additionally, one or more actions are performed at the pixel shader, utilizing the modified coverage data.

12 Claims, 3 Drawing Sheets

SYSTEM, METHOD, AND COMPUTER PROGRAM PRODUCT FOR INPUTTING MODIFIED COVERAGE DATA INTO A PIXEL SHADER

FIELD OF THE INVENTION

The present invention relates to computer graphics, and more particularly to performing graphics rendering.

BACKGROUND

Pixel shaders are commonly used during graphics rendering. For example, pixel shaders may calculate effects on a per-pixel basis during the rendering process. In another example, coverage may be computed at multiple locations (e.g., subsamples, etc.) within a pixel, where such locations may then be forwarded to a Z/Stencil test to determine which samples are to be written. Additionally, the coverage may then be sent to one or more pixel shaders. However, current techniques for communicating data to pixel shaders have been associated with various limitations.

For example, current pixel shaders do not directly receive depth/stencil test information. As a result, certain graphics processing tasks performed by the pixel shader may not be optimized. There is thus a need for addressing these and/or other issues associated with the prior art.

SUMMARY

A system, method, and computer program product are provided for inputting modified coverage data into a pixel shader. In use, coverage data modified by a depth/stencil test is input into a pixel shader. Additionally, one or more actions are performed at the pixel shader, utilizing the modified coverage data.

DETAILED DESCRIPTION

Figure 1:
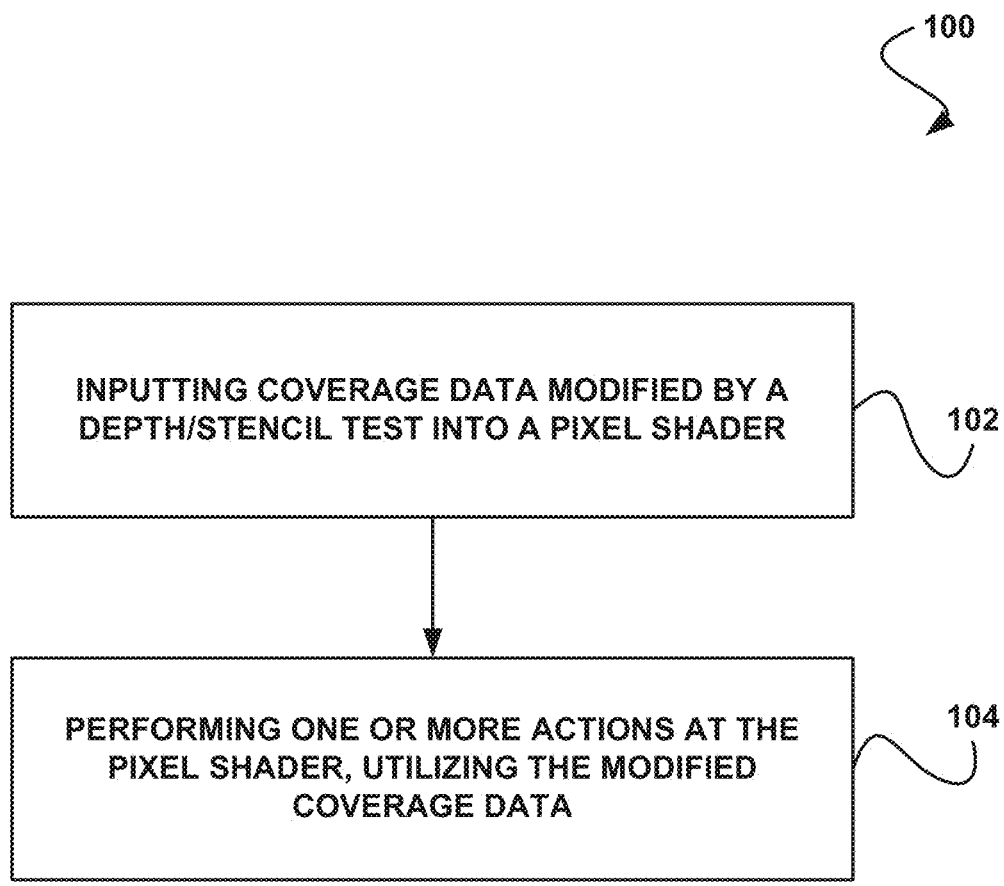
FIG. 1 shows a method for inputting modified coverage data into a pixel shader, in accordance with one embodiment.

FIG. 1 shows a method 100 for inputting modified coverage data into a pixel shader, in accordance with one embodiment. As shown in operation 102, coverage data modified by a depth/stencil test is input into a pixel shader. In one embodiment, unmodified coverage data may be modified by the depth/stencil test to create the coverage data modified by a depth/stencil test. In another embodiment, the unmodified coverage data may represent raster coverage data. For example, the unmodified coverage data may include an indication as to which subsamples within a multisampled pattern are covered by a generated primitive. In yet another embodiment, the unmodified coverage data may be associated with one or more pixels to be displayed.

Additionally, in one embodiment, the unmodified coverage data may be represented with a coverage bitmask. For example, this bitmask may indicate which subsamples within the multisampled pattern are covered by an input primitive. For instance, samples covered by the primitive may be noted with a 1 in the bitmask, and samples not covered by the primitive may be noted with a 0 in the bitmask. In another embodiment, the unmodified coverage data may be created by a rasterizer before the coverage data is modified by the depth/stencil test. For example, a rasterizer may receive input geometry and may perform rasterization on such geometry in order to create the coverage data. In another example, the rasterizer may be included within a rasterization module.

Further, in one embodiment, the unmodified coverage data may be input into the depth/stencil test (e.g., a z/stencil test, etc.) from the rasterizer. For example, the rasterizer may provide the unmodified coverage data to the depth/stencil test module. In another embodiment, the depth/stencil test may include both a depth test and a stencil test that are performed on the unmodified coverage data. For example, the depth/stencil test may include a depth test that may compare depth values for pixels associated with the rasterized input geometry against depth values in a depth buffer. In yet another embodiment, the depth/stencil test may include a depth test that may compare depth values in a depth buffer against specified minimum and maximum depth values.

Further still, in another example, the depth/stencil test may include a stencil test that may compare a reference value associated with the rasterized input geometry against a value in a stencil buffer. In another embodiment, the unmodified coverage data may be modified based on the depth/stencil test. For example, the unmodified coverage data may include a coverage bitmask, and one or more bits in the coverage bitmask may be altered as a result of the depth/stencil test. In another example, the depth/stencil test may modify the coverage bitmask by turning off bits within the coverage bitmask for subsamples within the multisampled pattern that fail the depth/stencil test.

Also, in one embodiment, the unmodified coverage data may be modified by the depth/stencil test within a pipeline. In another embodiment, the modified coverage data may be input into the pixel shader utilizing a multiplexer, where the multiplexer may be used to choose between the modified coverage data and unmodified coverage data. In yet another embodiment, the pixel shader may include a pixel shader module.

In addition, as shown in operation 104, one or more actions are performed at the pixel shader, utilizing the modified coverage data. In one embodiment, the pixel shader may perform shading operations at multiple locations within a pixel. In another embodiment, the pixel shader may perform shading operations at the locations specified by the modified coverage data. For example, the pixel shader may perform shading calculations at locations within the multisampled pattern that have not failed the depth/stencil test (e.g., locations that are not determined to be obscured/covered by the depth/stencil test, etc.).

Furthermore, in one embodiment, the pixel shader may store the modified coverage data to memory. For example, the pixel shader may write the modified coverage data to memory for later processing by one or more processes (e.g., order-independent transparency (OIT) processing, hybrid rendering, anti-aliasing, etc.). In another embodiment, the pixel shader may receive both the coverage data modified by a depth/stencil test as well as the unmodified coverage data. In still another embodiment, the pixel shader may choose between the modified coverage data and the unmodified coverage data that has been received.

In this way, coverage data that has been modified by a depth/stencil test may be read into the pixel shader, and the pixel shader may then have the opportunity to change its behavior based on the modified coverage. Additionally, the coverage data may indicate which subsamples within the multisampled pattern are not visible for each pixel of a display, and this information may be used to calculate proper attributes for each pixel while accounting for occlusion between overlapping geometry in a more efficient and direct manner without having to resort to additional rendering passes.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
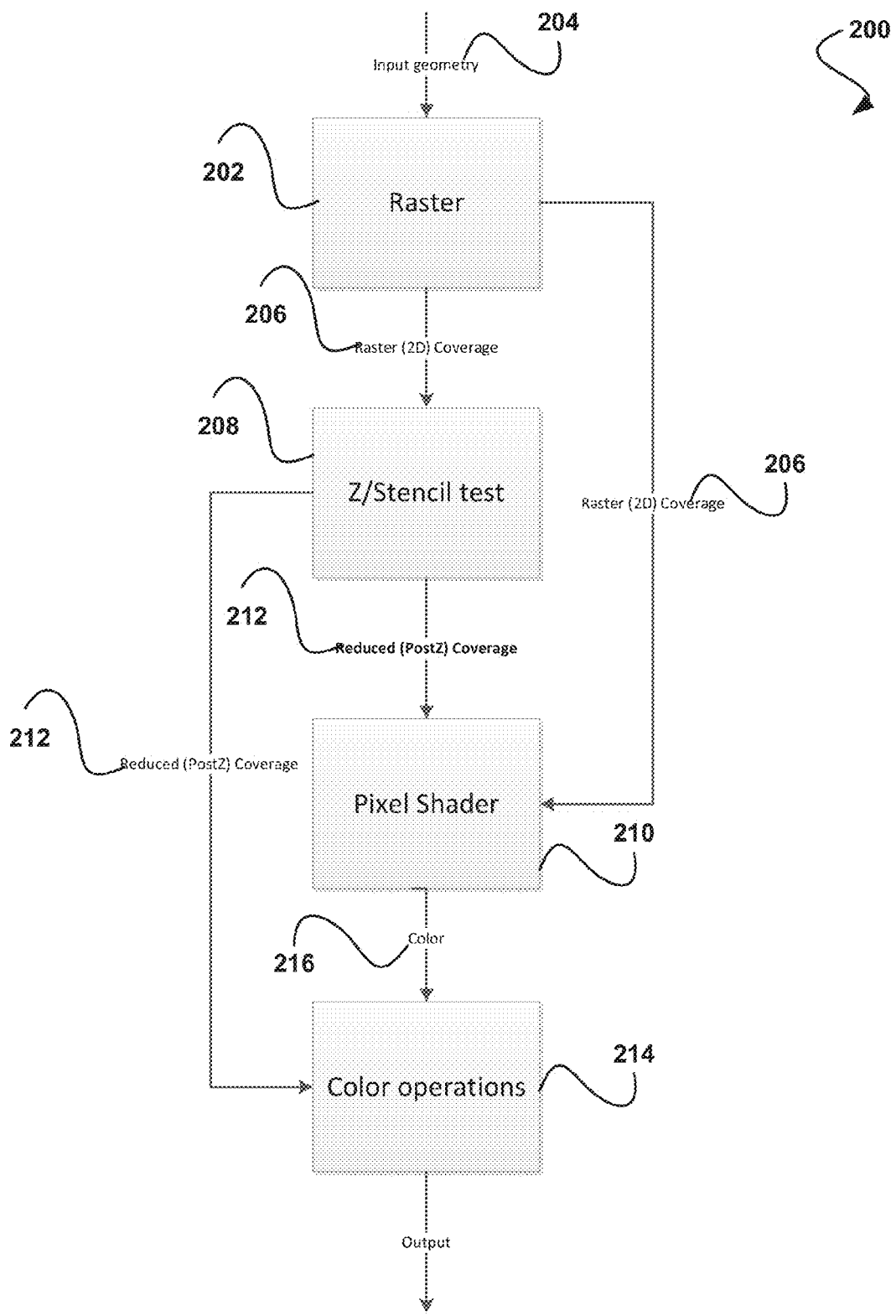
FIG. 2 shows an exemplary rendering pipeline, in accordance with another embodiment.

FIG. 2 shows an exemplary rendering pipeline 200, in accordance with another embodiment. As an option, the rendering pipeline 200 may be carried out in the context of the functionality of FIG. 1. Of course, however, the rendering pipeline 200 may be implemented in any desired environment. It should also be noted that the aforementioned definitions may apply during the present description.

As shown, the rendering pipeline 200 includes a rasterization module 202 that receives input geometry 204 and outputs a two-dimensional (2D) raster coverage data 206. In one embodiment, the input geometry 204 may include one or more shapes. For example, the input geometry 204 may include an image or a portion of an image described in a vector graphics format. In another embodiment, the rendering pipeline 200 may include an early-Z pipeline (e.g., a pipeline running in early-Z mode, where a depth/stencil test is performed by the depth/stencil test module 208 on the two-dimensional (2D) raster coverage data 206 before such two-dimensional (2D) raster coverage data 206 is sent to a pixel shader module 210).

Additionally, in one embodiment, the rasterization module 202 may perform one or more rasterization operations, utilizing the input geometry 204. In one embodiment, the rasterization module 202 may convert the input geometry 204 into a raster image (e.g., one or more pixels, etc.) for output on a display. In another embodiment, the rasterization module 202 may determine fragment coverage associated with the input geometry. For example, the rasterization module 202 may perform multisampled rasterization by determining which subsamples within a multisampled pattern of the raster image are covered by a generated primitive. In another example, the two-dimensional (2D) raster coverage data 206 may include an indication of the subsamples determined by the rasterization module to be covered by the input primitive.

Further, in one embodiment, the two-dimensional (2D) raster coverage data 206 may include a bitmask. For example, the two-dimensional (2D) raster coverage data 206 may include a sequence of bits that indicate which subsamples (e.g., sample locations, pixels, etc.) within the multisampled pattern of the raster image are covered by an input primitive.

Further still, the two-dimensional (2D) raster coverage data 206 is sent to both the depth/stencil test module 208 and the pixel shader module 210. In response to receiving the two-dimensional (2D) raster coverage data 206, the depth/stencil test module 208 determines and outputs reduced post-Z raster coverage data 212. In one embodiment, the depth/stencil test module 208 may analyze the two-dimensional (2D) raster coverage data 206 and may turn off coverage for subsamples within the two-dimensional (2D) raster coverage data 206 that fail a depth/stencil test.

For example, the depth/stencil test module 208 may perform a depth test that may compare depth values for pixels associated with the two-dimensional (2D) raster coverage data 206 against depth values stored in a depth buffer. In another example, the depth/stencil test module 208 may perform a stencil test that may compare a reference value associated with the two-dimensional (2D) raster coverage data 206 against values in a stencil buffer.

Also, in one embodiment, the reduced post-Z raster coverage data 212 may include a modified version of the two-dimensional (2D) raster coverage data 206 that was input to the depth/stencil test module 208. For example, the two-dimensional (2D) raster coverage data 206 may be modified based on the depth/stencil test performed by the depth/stencil test module 208, such that one or more bits in the two-dimensional (2D) raster coverage data 206 may be altered as a result of the depth/stencil test.

In another embodiment, the depth/stencil test may modify the two-dimensional (2D) raster coverage data 206 to create the reduced post-Z raster coverage data 212 by turning off coverage within the two-dimensional (2D) raster coverage data 206 for subsamples within the two-dimensional (2D) raster coverage data 206 that fail the depth/stencil test. In this way, the depth/stencil test module 208 may eliminate one or more sample locations within the two-dimensional (2D) raster coverage data 206 to create the reduced post-Z raster coverage data 212.

In addition, the reduced post-Z raster coverage data 212 is sent to the pixel shader module 210 and the color operations module 214. In one embodiment, the pixel shader module 210 may select either the two-dimensional (2D) raster coverage data 206 input from the rasterization module 202 or the reduced post-Z raster coverage data 212 sent from the depth/stencil test module 208 for use during shading.

For example, the pixel shader module 210 may select either the two-dimensional (2D) raster coverage data 206 or the reduced post-Z raster coverage data 212 utilizing a multiplexer located at the input of the pixel shader module 210. In another embodiment, the pixel shader module 210 may select both the two-dimensional (2D) raster coverage data 206 and the reduced post-Z raster coverage data 212 for use during shading. In another embodiment, only the reduced post-Z raster coverage data 212 may be sent to the pixel shader module 210. For example, the two-dimensional (2D) raster coverage data 206 may not be sent to the pixel shader module 210, such that the pixel shader module 210 may select the reduced post-Z raster coverage data 212 by default.

Furthermore, in one embodiment, the pixel shader module 210 may perform one or more actions utilizing the reduced post-Z raster coverage data 212 sent from the depth/stencil test module 208. For example, the pixel shader module 210 may compute color calculations 216 and other attributes at sample locations indicated by the reduced post-Z raster coverage data 212. In this way, the pixel shader module 210 may know which sample locations will be written to the frame buffer, and calculations may not be performed by the pixel shader module 210 on sample locations that have been obscured.

In another example, the pixel shader module 210 may store the reduced post-Z raster coverage data 212 in memory for later access by one or more processes running one or more algorithms. For example, the reduced post-Z raster coverage data 212 may be stored in memory and may be accessed for order-independent transparency (OIT) processing, where such OIT processing may use the reduced post-Z raster coverage data 212 in a compositing (e.g. fragment blending, etc.) step of the OIT processing that calls for multisampling, which may enable more efficient compositing. In another example, the reduced post-Z raster coverage data 212 may be stored in memory and may be used as an input for performing hybrid rendering or anti-aliasing.

In this way, post-Z coverage data may be provided to the pixel shader module 210 such that the pixel shader module 210 may be aware of which samples within the coverage data fail the Z/stencil test of the depth/stencil test module 208. This may enable more efficient processing and may reduce a number of rendering passes in multisampled deferred shading, order-independent transparency and hybrid rendering scenarios (e.g., combining rasterized graphics with per-sample processing, etc.).

Figure 3:
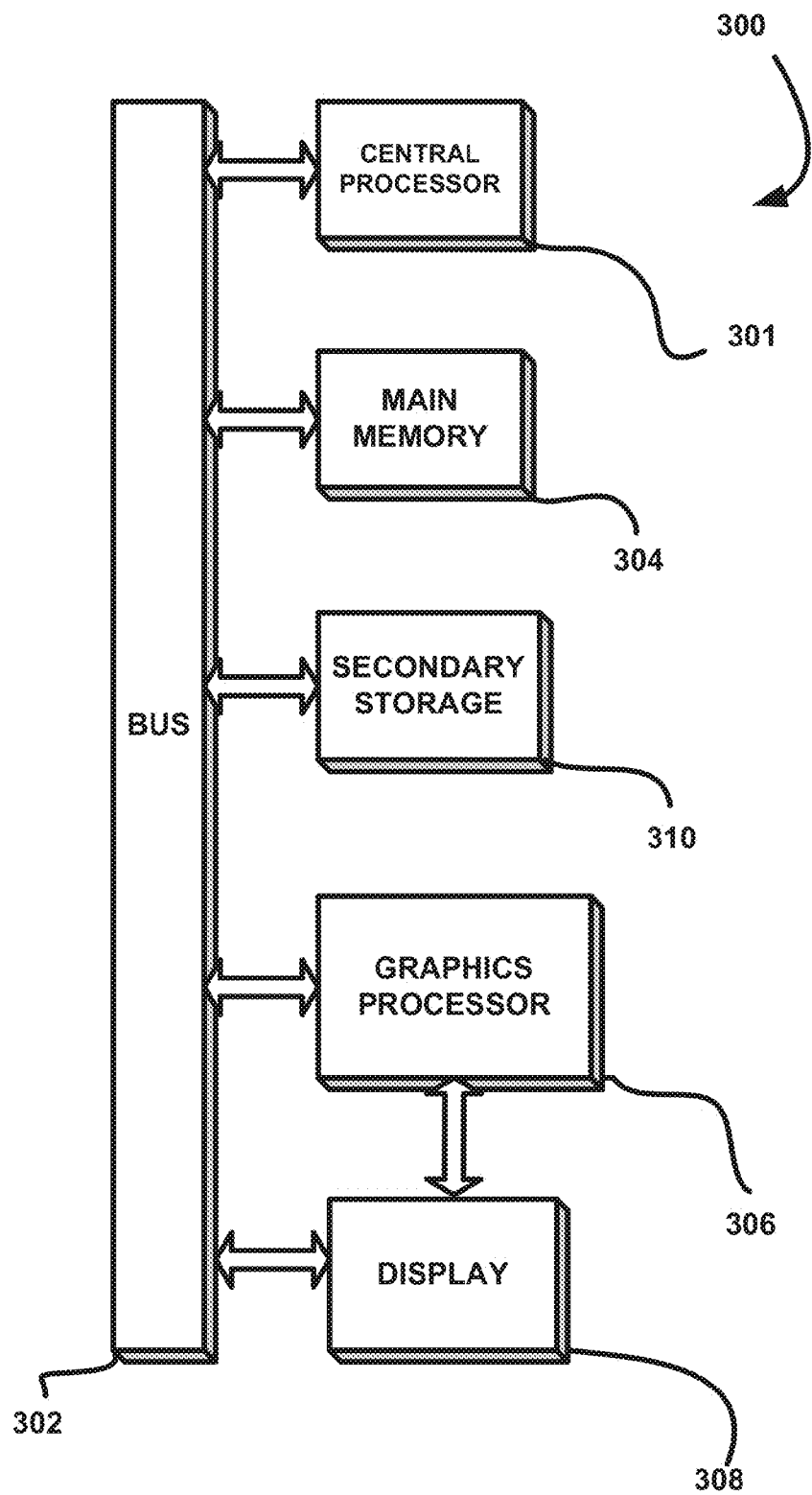
FIG. 3 illustrates an exemplary system in which the various architecture and/or functionality of the various previous embodiments may be implemented.

FIG. 3 illustrates an exemplary system 300 in which the various architecture and/or functionality of the various previous embodiments may be implemented. As shown, a system 300 is provided including at least one host processor 301 which is connected to a communication bus 302. The system 300 also includes a main memory 304. Control logic (software) and data are stored in the main memory 304 which may take the form of random access memory (RAM).

The system 300 also includes a graphics processor 306 and a display 308, i.e. a computer monitor. In one embodiment, the graphics processor 306 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 300 may also include a secondary storage 310. The secondary storage 310 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 304 and/or the secondary storage 310. Such computer programs, when executed, enable the system 300 to perform various functions. Memory 304, storage 310 and/or any other storage are possible examples of computer-readable media.

In one embodiment, the architecture and/or functionality of the various previous figures may be implemented in the context of the host processor 301, graphics processor 306, an integrated circuit (not shown) that is capable of at least a portion of the capabilities of both the host processor 301 and the graphics processor 306, a chipset a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 300 may take the form of a desktop computer, laptop computer, and/or any other type of logic. Still yet, the system 300 may take the form of various other devices m including, but not limited to a personal digital assistant (PDA) device, a mobile phone device, a television, etc.

Further, while not shown, the system 300 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving coverage data at a depth/stencil test module, wherein the coverage data includes two-dimensional (2D) raster coverage data output by a rasterization module that indicates which subsamples within a multi-sampled pattern are covered by a primitive;
modifying the coverage data by the depth/stencil test module to generate modified coverage data, wherein the coverage data is modified by modifying values in the coverage data for any subsamples that fail a depth/stencil test;
inputting the modified coverage data into a pixel shader; and
performing one or more actions at the pixel shader, utilizing the modified coverage data,
wherein the rasterization module, the depth/stencil test module, and the pixel shader are included in a rendering pipeline implemented by a graphics processing unit.

2. The method of claim 1, wherein the coverage data includes a bitmask, wherein each bit in the bitmask corresponds to a different subsample in the multi-sampled pattern.

3. The method of claim 1, wherein the rasterization module performs one or more rasterization operations utilizing the primitive to generate the coverage data.

4. The method of claim 1, wherein the coverage data and the modified coverage data are input into the pixel shader utilizing a multiplexer.

5. The method of claim 1, wherein the pixel shader performs shading operations on subsamples within the multi-sampled pattern in accordance with the modified coverage data.

6. The method of claim 1, wherein the pixel shader stores the modified coverage data to a memory.

7. The method of claim 6, wherein the modified coverage data is stored to the memory for later order-independent transparency (OIT) processing.

8. The method of claim 1, wherein the pixel shader receives both the coverage data as well as the unmodified coverage data.

9. The method of claim 8, wherein the pixel shader chooses between the modified coverage data and the unmodified coverage data that have been received.

10. A computer program product embodied on a non-transitory computer readable medium, comprising:
code for receiving coverage data at a depth/stencil test module, wherein the coverage data includes two-dimensional (2D) raster coverage data output by a rasterization module that indicates which subsamples within a multi-sampled pattern are covered by a primitive;
code for modifying the coverage data by the depth/stencil test module to generate modified coverage data, wherein the coverage data is modified by modifying values in the coverage data for any subsamples that fail a depth/stencil test;

code for inputting the modified coverage data into a pixel shader; and code for performing one or more actions at the pixel shader, utilizing the modified coverage data, wherein the depth/stencil test module and the pixel shader are implemented within a rendering pipeline.

11. A system, comprising:

a processor including:

a rasterization module configured to receive a primitive and output coverage data that includes two-dimensional (2D) raster coverage data that indicates which subsamples within a multi-sampled pattern are covered by the primitive, a depth/stencil test module configured to receive the coverage data and generate modified coverage data, wherein the coverage data is modified by modifying values in the coverage data for any subsamples that fail a depth/stencil test, and a pixel shader configured to receive the modified coverage data and perform one or more actions utilizing the modified coverage data.

12. The system of claim 11, wherein the processor is coupled to memory via a bus.

\* \* \* \* \*